United States Patent [19]
Gant et al.

[11] 4,326,411
[45] Apr. 27, 1982

[54] METHOD AND APPARATUS FOR MONITORING FLUID FLOW

[75] Inventors: Robert C. Gant; John E. Reeves, both of Duncan, Okla.

[73] Assignee: Halliburton Company, Duncan, Okla.

[21] Appl. No.: 167,920

[22] Filed: Jul. 14, 1980

[51] Int. Cl.³ .............................................. E21B 47/06
[52] U.S. Cl. ..................................................... 73/155
[58] Field of Search ................. 73/155, 154; 166/252; 364/422

[56] References Cited

U.S. PATENT DOCUMENTS

| | | | |
|---|---|---|---|
| 3,905,226 | 9/1975 | Nicolas | 73/155 |
| 3,911,743 | 10/1975 | Nicolas | 73/229 |
| 3,934,467 | 7/1976 | Nicolas | 73/155 |
| 3,954,006 | 5/1976 | Anderson et al. | 73/155 |
| 4,015,194 | 3/1977 | Epling | 73/155 X |

*Primary Examiner*—Jerry W. Myracle
*Attorney, Agent, or Firm*—John H. Tregoning; Joseph A. Walkowski, Jr.; E. Harrison Gilbert, III

[57] ABSTRACT

A method and apparatus for monitoring conditions in a fluid flow path so that the composition and operation of the flow path can be determined is disclosed. The apparatus includes a fluid flow detector, such as a gas flow logging tool, which detects the velocity at which a fluid, such as a gas, flows along the fluid flow path, such as a gas injection conduit used in a gas lift program for extracting oil from a well. The monitoring apparatus also includes a pressure detector and a temperature detector. Each of these detectors provides a respective electrical signal to a recorder unit, such as a strip chart recorder, for creation thereby of respective logs. The logs generated by the recorder unit permit qualitative and quantitative analyses of identifiable fluid flow path phenomena, such as the locations of valves and the volumetric flow of the fluid, to be made.

41 Claims, 5 Drawing Figures

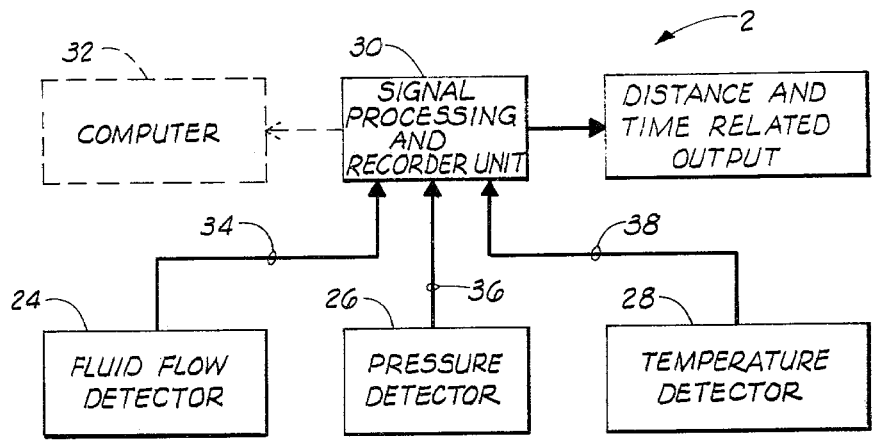
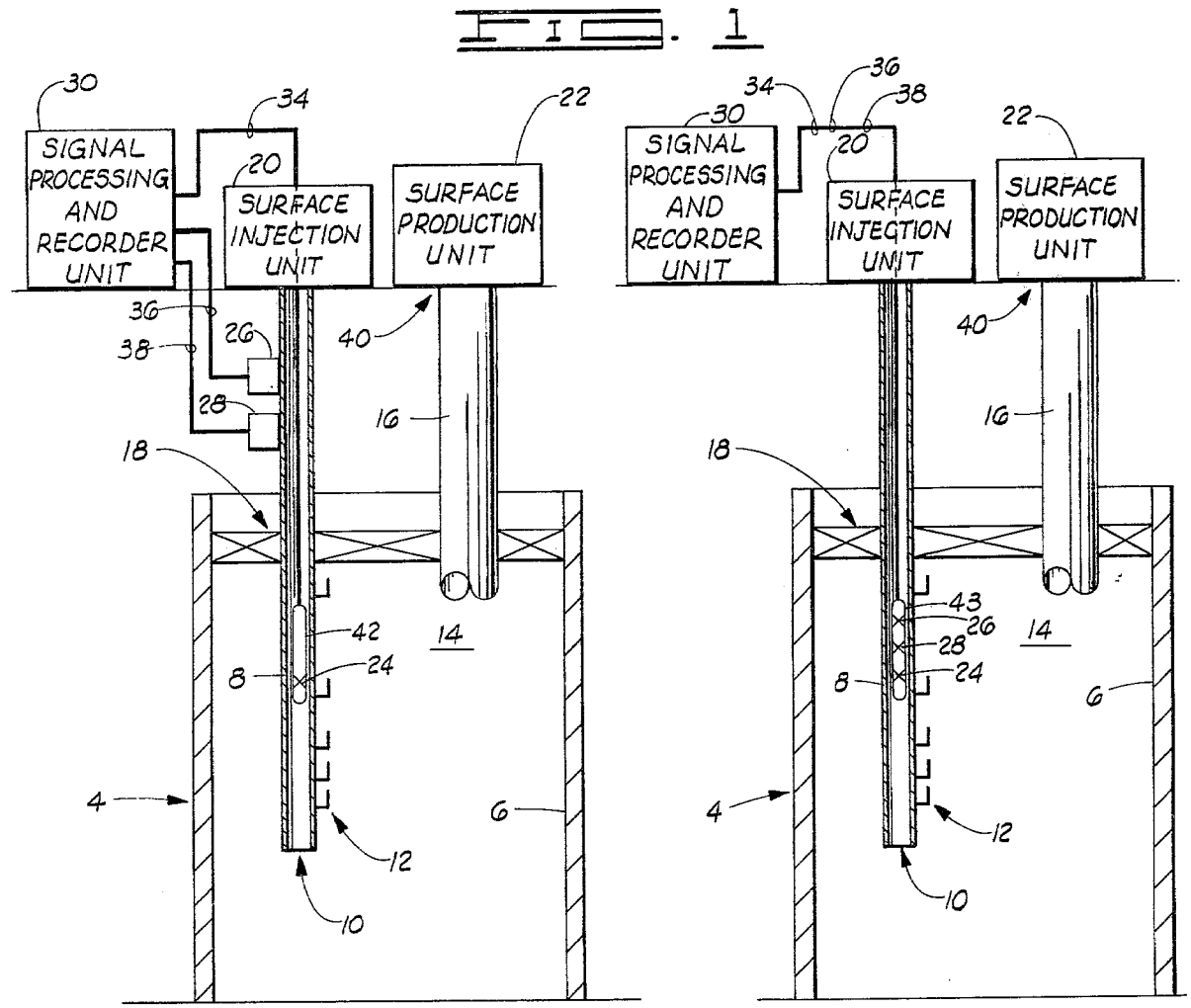

METHOD AND APPARATUS FOR MONITORING FLUID FLOW

This invention relates generally to methods and apparatus for monitoring fluid flow and more particularly, but not by way of limitation, to methods and apparatus for monitoring the velocity, pressure and temperature of a gas being injected into a well to qualitatively and quantitatively determine identifiable downhole phenomena associated with these parameters.

In the oil industry the injection of gas into a well is used, for example, as a primary recovery means for lifting from the well substances, such as oil. One type of gas lift program includes injecting gas into the well through a tubing string extending into the well. The tubing string directs the gas into the well through an orifice near the lower end of the string and/or through one or more valves which are placed along the length of the tube. As injection occurs through the valves, production of the substance within the well occurs through the annulus extending between the tubing string and the casing of the well. Another type of lift program includes injecting the gas downward through the annulus and into the tubing string through valves at spaced locations, and producing the substance upward through the tubing string.

To efficiently implement and maintain a gas lift program, it is necessary to learn the downhole conditions of the lifted well. For example, the cause of a drop in production of a previously satisfactorily producing well can be determined if the proper conditions are monitored. Additionally, the problems in a well which is producing significantly below other wells in the same field can be solved by detecting the appropriate conditions in the anomalous well. The production of even apparently satisfactorily producing wells can be increased by analyzing the proper downhole conditions to learn where to place valves, what type of valves to use and how to operate them to achieve maximum production at some optimum gas/oil ratio, which is normally just below the critical point of surging. Surging occurs when undissolved gas rises through the oil being lifted. Knowledge of the appropriate downhole conditions also facilitates the determination of identifiable downhole phenomena such as the locations of the valves and collars along the tubing string, whether the valves are permitting gas to flow into the well, and if so, how much gas is flowing. Therefore, it is apparent that there is the need to determine what appropriate conditions must be monitored and to provide a method and apparatus for monitoring the appropriate conditions so that qualitative and quantitative anaylses of downhole phenomena can be made.

There is also the need for such a method and apparatus which can be performed and used so that production from the well is not significantly affected. That is, because a gas lift program is implemented to achieve production, it is desirable that this program and the resulting production not be significantly impacted while monitoring is done to determine how this production can be more efficiently performed.

There have been previous attempts to determine what appropriate conditions should be monitored and to provide methods and apparatus for monitoring them. One of these attempts included making sonic or noise surveys and trying to correlate the resulting sonic tracings with downhole structures and gas flow patterns. Another attempt included taking pressure readings and attempting to correlate them to downhole phenomena.

One shortcoming of these attempts is that it is difficult, if not impossible, to correlate the sonic or pressure logs with specifically identifiable sub-surface phenomena such as particular locations of valves or quantities of gas passing through the valves. Another shortcoming of these attempts is that they often cause extended interruptions in production by requiring lengthy set-up, run-in and take-down times.

The present invention overcomes the above-noted and other shortcomings of the prior art by providing a novel and improved method and apparatus for monitoring appropriate conditions along the injected gas flow path so that appropriate qualitative and quantitative analyses can be made to determine identifiable downhole phenomena. Furthermore, the present invention provides a method and apparatus which does not significantly impact production from the well with which the method and apparatus are used. Indeed, downtime occurs only when the apparatus of the present invention is inserted into or retracted from the well. No downtime results from the logging of the appropriate downhole conditions because the logging occurs simultaneously with production.

The present invention provides a log corresponding to the velocity of the gas as it flows downward into the well. This log is used to qualitatively reveal identifiable downhole phenomena such as the locations of valves and whether the valves are permitting gas to flow therethrough. The present invention further provides logs of pressures and temperatures which are used with the velocity logs to quantitatively indicate the total injected gas and the percentages of the total amount of gas flowing through the identified valves.

Although the preceding discussion is directed to the specific example of a gas lift program used to recover oil from a well, the present invention is generally applicable to any appropriate fluid and fluid flow path; therefore, the present invention broadly provides a system for monitoring conditions along a fluid flow path. This monitoring system includes velocity detecting means for detecting the velocity of the fluid at a plurality of locations along the flow path. The present invention also includes recording means for recording the velocity detected at each of the plurality of locations so that substantial variations in the recorded velocities are perceivable for correlation to identifiable flow path phenomena. The present invention further comprises pressure detecting means, associated with the recording means, for determining pressures associated with the fluid flow path. The present invention also comprises temperature detecting means, associated with the recording means, for sensing temperatures associated with the fluid flow path. The recording means of the present invention includes means for providing an output which correlates the velocities, pressures and temperatures detected by the respective detecting means.

From the foregoing it is a general object of the present invention to provide a novel and improved method and apparatus for monitoring conditions along a fluid flow path. Other and further objects, features and advantages of the present invention will be readily apparent to those skilled in the art when the following description of the preferred embodiments is read in conjunction with the accompanying drawings.

FIG. 1 is a block diagram of a preferred embodiment of the present invention.

FIG. 2 is a schematic illustration of a preferred embodiment of the present invention associated with a well.

FIG. 3 is a schematic illustration of a second preferred embodiment of the present invention associated with a well.

Figure 4A:
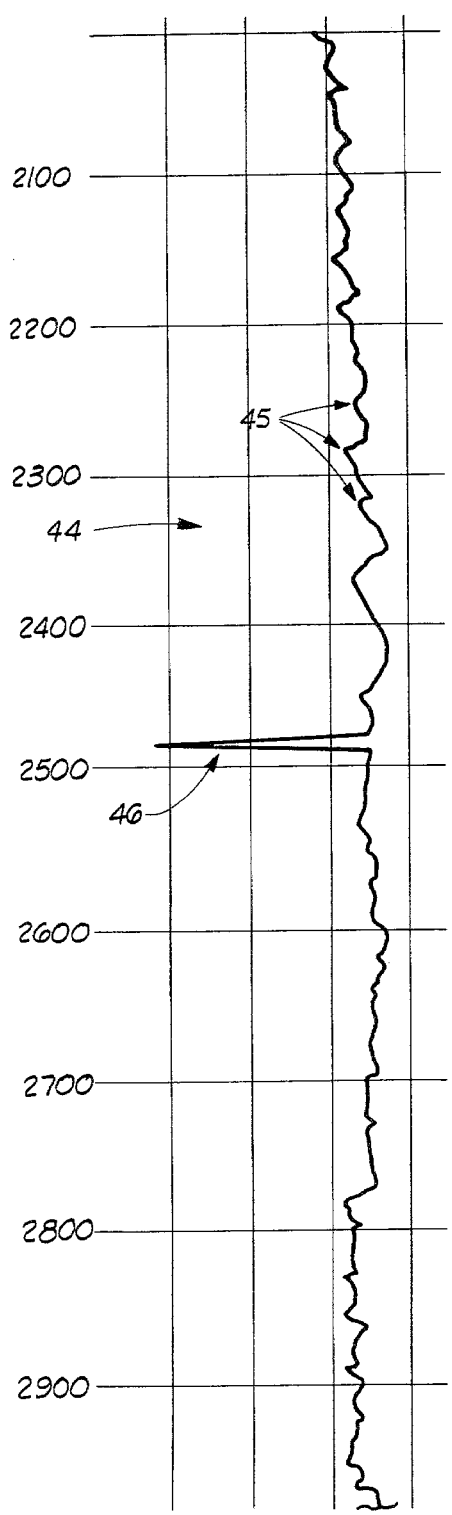
FIG. 4A is a schematic illustration of a velocity log showing a first type of response of the present invention.

With reference to the drawings, and in particular to FIGS. 1–3, a preferred embodiment of a system constructed in accordance with the present invention, for monitoring conditions in a fluid flow path along which a fluid flows will be described. The system, generally identified by the reference numeral 2 in FIG. 1, more particularly comprises, in a preferred embodiment, a system for monitoring conditions in a well 4 having a fluid (such as natural gas, carbon dioxide gas, nitrogen gas or other suitable gas or liquid) injected therein through a fluid inlet means.

A schematic illustration of a preferred embodiment of the fluid flow path is depicted in FIGS. 2 and 3 as the fluid inlet means of the well 4 which also includes a casing 6. The fluid inlet means of the embodiments shown in FIGS. 2–3 is an appropriate injection string or conduit 8 as is known in the art. The conduit 8 includes an orifice 10 located near the lower end of the conduit. The conduit 8 also includes one or more valve mounting assemblies or mandrel means 12, each of which includes in the preferred embodiment a valve activated by fluid or pressure differential as is known in the art. The valves may be removed and replaced by means of the proper tool on a wire-line run in from the surface as is known in the art. The conduit 8 further includes one or more collars (not shown) or other suitable means for joining sections of the conduit together.

The fluid flow path defined by the conduit 8 is the means along which the fluid flows into the well 4 through the orifice 10 or through the valve means 12. As the fluid leaves the conduit 8, it enters a region which extends between the conduit 8 and the casing 6 and is defined as an annulus 14. Extending into the annulus 14 is a production string 16 through which the substance desired to be recovered from the well 4 is retrieved. Also placed within the annulus 14 are packing members 18 as known in the art.

This arrangement of elements is used, for example, to implement a first type of gas lift program whereby a suitable gas is injected through the conduit 8 into the annulus 14 to lift oil located therein upward into and through the production string 16. To supply the gas to the conduit 8, the gas lift system includes a surface injection unit 20 of the type known in the art. In general the surface injection unit 20 includes means for providing the fluid, such as the type used in the gas lift program, to the fluid inlet means, such as the conduit 8, so that the fluid flows within the conduit 8 from an uphole location to a downhole location.

As the surface injection unit 20 forces the gas into the well 4, it is dissolved in the recoverable substance, such as oil, and the mixture of gas and oil is lifted through the annulus 14 and into the production string 16 by the gas injected through valve means 12 into a surface production unit 22 of the type known in the art and generally including a valving structure for dispersing the recovered substance to desired locations.

It is to be noted that in an alternative type of gas lift program, the gas is injected into the annulus 14 through what has been termed the production string 16 and the recovered substance is lifted upward through what has been termed the conduit 8. The present invention may be utilized with either type of gas lift program or with any other suitable fluid flow system.

The monitoring system 2 constructed in accordance with the present invention is shown in FIG. 1 to include a fluid flow detecting means 24, a pressure detecting means 26, a temperature detecting means 28 and a signal processing and recorder means 30. The monitoring system 2 also includes computer means 32 which is responsive to the recorder means and which electronically analyzes the detected conditions. Arrows 34, 36 and 38 depict that each of the detector means 24–28 provides a respective output to the signal processing and recorder means 30. The identically numbered arrows 34, 36 and 38 shown in FIGS. 2 and 3 depict where the corresponding detector means is located with respect to the well illustrated in each of these two figures. In FIG. 2 the fluid flow detecting means 24 is disposed in a housing 42 positioned in the conduit 8, and the pressure detecting means 26 and the temperature detecting means 28 are associated with the conduit 8 to monitor the pressure and temperature at the top thereof. FIG. 3 illustrates that all three of the detecting means 24–28 are run as a combination tool 43 disposed within the conduit 8.

The housing 42 or combination tool 43 is constructed of a suitable material as is known in the art and is connected to an appropriate hoist means for raising and lowering it within the conduit 8.

The fluid flow detecting means 24 includes velocity detecting means for detecting the velocity of the fluid as it flows along the fluid flow path. For the embodiment shown in FIGS. 2 and 3, the velocity detecting means detects the velocity of the fluid, such as the gas used in a gas lift program, as it flows downward from an uphole location to a downhole location. The velocity detecting means is enclosed in the housing 42 or combination tool 43 for the embodiment shown in FIGS. 2–3 and thus detects the velocity of the fluid at a plurality of locations within the fluid inlet means as the housng 42 or combination tool 43 is moved longitudinally through the conduit 8.

In the preferred embodiments the fluid flow detector means includes a gas flow logging tool of the type manufactured by Halliburton Services. This tool includes an impeller associated with an electromagnetic circuit whereby as the fluid flows along the fluid flow path past the impeller, the impeller magnetically actuates the electromagnetic circuit to generate an electrical signal which is proportional to the velocity of the passing fluid and which is transmitted to the signal processing and recorder means 30. The transmission of this electrical signal to the signal processing and recorder means 30 is indicated in the figures by the arrow 34. Other suitable means for detecting the velocity of the flowing fluid can also be used.

The pressure detector means 26 includes a suitable pressure transducer of a type which detects pressure at the top of the conduit 8 or of a type which detects pressures within the flow path along which the injected fluid flows. For example, the pressure transducer may be a Gould Statham P2000 or P1000 series transducer. Other suitable transducers may also be used. The preferred type of pressure transducer is one which converts the detected pressure into a proportional electrical signal which is transmitted to the signal processing and recorder means 30 for correlated recording with the velocity detected by the velocity detecting means.

As represented in FIG. 2 the pressure detecting means is located in one preferred embodiment at the top of the conduit 8 near the location at which the gas is injected into the conduit 8 for detecting the pressure and transmitting a corresponding electrical signal to the signal processing and recorder means 30 as represented by the arrow 36. The preferred embodiment depicted in FIG. 3 shows that the pressure detecting means is included within the combination tool 43 and thus provides its electrical signal to the recording means as depicted by the arrow 36. When the pressure detecting means is placed in the combination tool 43, it provides means for determining the pressure of the fluid at a plurality of locations along the fluid flow path.

The temperature detecting means 28 provides means for sensing temperature in the fluid flow path. In the preferred embodiment the temperature detecting means includes means for measuring the temperature and converting the temperature into a proportional electrical signal which is transmitted to the signal processing and recorder means 30 for recording with the detected velocities and pressures. For example, the temperature detecting means 28 may include a Remco temperature sub mounted within combination tool 43, as depicted in FIG. 3, for measuring temperatures at a plurality of locations along the fluid flow path. In the preferred embodiment shown in FIG. 2, the temperature detecting means 28 is placed at the top of conduit 8 to measure injection string temperature.

The signal processing and recorder means 30 includes means for recording the velocity detected at each of the plurality of positions along the fluid flow path so that relatively substantial variations in the recorded velocities are perceivable for correlation to identifiable fluid flow path phenomena, such as the locations of the valve means 12 and the status thereof (e.g., whether particular ones of the valve means are permitting gas to flow therethrough, and at what rate). In responding to the velocity detecting means of the fluid flow detector 24 the signal processing and recorder means 30 generates a first response which signifies the location in the well of an identifiable structural element, such as a collar, and generates a second response which signifies the passage of the fluid from the fluid flow path, such as through one or more of the valve means 12.

The signal processing and recorder means 30 further includes means for providing an output correlating the detected pressures and temperatures with the detected velocities. In the preferred embodiments the signal processing and recorder means 30 provides an output which correlates by time of detection and depth of detection the recordings of each of the detected velocities with a respective recording of each of the other detected parameters.

Figure 4B:
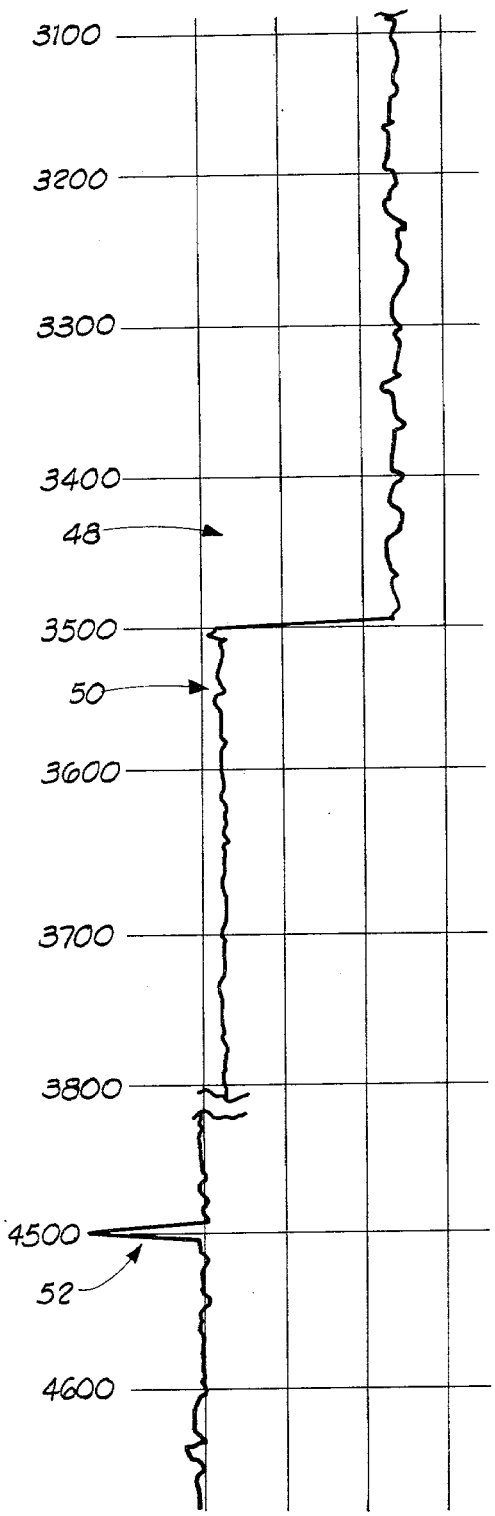
FIG. 4B is a schematic illustration of a velocity log showing a second response of the present invention.

In the preferred embodiments the signal processing and recorder means 30 is a strip chart recorder such as a Welex Recorder Panel 600 series or other suitable device; however, other appropriate recorder means can be used. Through the use of a strip chart recorder a graphic depiction of the detected parameters is made. That is, as each electrical signal is transmitted from the respective detecting means to the strip chart recorder, a chart visibly representing each electrical signal is created. In the preferred embodiments the strip chart recorder makes a continuous chart for each of the detected parameters so that for the embodiments shown in FIGS. 2 and 3, three tracings, each corresponding to a respective one of the detected velocity, pressure and temperature parameters, are made. For the embodiment of FIG. 3, each of these tracings is preferably correlated by time and distance as the combination tool 43 is longitudinally moved along the length of the conduit 8. Therefore, the strip chart recorder provides an output which relates the detected velocities, pressures and temperatures both by time and distance. For the embodiment of FIG. 2, only the velocity tracing is correlated by time and distance. An example of a tracing generated by the signal processing and recorder means 30 in response to the velocity detecting means is illustrated in FIGS. 4A–4B.

The computer 32 includes appropriate input means, output means, and computational means as known in the art for electronically acquiring and manipulating the detected data of velocity, pressure and temperature to provide a desired analysis of the data.

With reference to all the drawings the operation of the present invention will be described with reference to an oil well production operation utilizing a gas lift program; however, it is to be understood that the present invention can be used with any suitable fluid flow system. It will be assumed that the gas lift program is conducted on the well 4 having a gas inlet means which includes the conduit 8 and further having a fluid outlet means which includes the production string 16. To recover the oil located in the well 4, gas is injected downwardly through the conduit 8 and into the annulus 14 through the orifice 10 near the end of the conduit 8 and/or through any of the valves 12 having mandrels in their open position, responsive to the oil level in the well and/or pressure in the conduit or well bore.

With reference to the FIG. 3 embodiment, the operation of the monitoring system 2 of the present invention during the gas lift program will be described. Initially, the combination tool 43 is lowered into the conduit 8 by means of a suitable hoist means. During this operation there will be a temporary shutdown of production as the combination tool 43 is inserted into the conduit 8. After placement of the combination tool 43 in the conduit 8, production recommences and monitoring of the conditions along the flow path begins.

The downhole conditions are monitored by lowering the combination tool 43 through the conduit 8 at a predetermined rate and having the detecting means 24–28 contained therein respond to the respective downhole conditions and transmit proportional electrical signals to the signal processing and recorder means 30. For example, in the preferred embodiment wherein the Halliburton Services gas flow logging tool forms a part of the velocity detecting means, the gas which is forced into the conduit by the surface injection unit 20 passes downward and into contact with the impeller of the gas flow logging tool. The gas flows past the impeller, through flow straighteners within the tool, out the lower portion of the tool and back into the conduit 8. This flow of the gas rotates the impeller so that a proportional electrical signal is generated and transmitted to the signal processing and recorder means 30. In response to the electrical signals received from the detecting means 24, the signal processing and recorder means 30 creates a log which is proportional to the velocity of the gas. An example of such a log is shown in FIGS. 4A and 4B.

It is to be noted that the Halliburton Services gas flow logging tool is used in a manner which is contrary to its normal manner of use wherein a gas flow is measured as it enters the conduit 8 through the orifice 10 and passes upward through the flow straightener and then past the impeller. Utilizing the tool in accordance with the present invention so that the gas enters from above and passes through the impeller prior to passing through the flow straighteners is advantageous because the impeller responds to velocity changes created by variations in the cross-sectional area of the conduit 8 such as are caused by collars and mandrels, thus indicating the location of these variations despite the substantially constant gas flow velocity.

The transducers within the pressure detecting means 26 and the temperature detecting means 28 also coact with the gas flow to measure the respective parameters and to transmit corresponding electrical signals to the signal processing and recorder means 30 for creation thereby of appropriate logs. As previously noted, in the preferred embodiment of FIG. 3 the logs generated by the signal processing and recorder means 30 for each of the detected parameters are correlated by time and depth.

It should be noted that the electrical signals 34, 36 and 38 generated in the embodiment of FIG. 3 are preferably matrixed and transmitted from combination tool 43 to signal processing and recorder means 30 through a common wireline means.

Once the downhole conditions have been detected and recorded, the various parameters are compared with respect to time and distance to qualitatively determine identifiable downhole phenomena. An example of this will be described with reference to the velocity log depicted in FIGS. 4A–4B. In FIG. 4A there is illustrated a log 44 of the gas velocity as detected by the velocity detecting means located in the housing 42 or combination tool 43. The log reveals that between the depths of 2200 feet and 2500 feet the velocity of the gas was relatively constant because the log tracing 44 shows relatively small variations within the depth range over the time period during which the log was made. However, the variations shown as small, impulse-like responses 45 are one response of the signal processing and recorder means 30 and are substantial enough to indicate the passage of the velocity detection means 24 past structural elements, in this instance coupling collars, in the conduit.

The log 44 further shows a significant change in the gas velocity occurred at the depth of approximately 2500 feet. This change appears as a spike-like response 46 in that there is a relatively large change in magnitude over a relatively short period of time and distance. This spike-like response is a further response of the signal processing and recorder means 30 and is indicative of a change in gas velocity resulting from the presence of a mandrel means 12 at that depth. Because the change in velocity lasted for only a short distance, it is indicative of an identifiable downhole phenomenon such as a mandrel means which creates a change in gas velocity due to the increase of cross-sectional area for a correspondingly short distance. Therefore such a response is qualitatively used to disclose that there is a closed valve located in the conduit at mandrel means 12 at a depth of approximately 2500 feet.

Another response of the signal processing and recorder means 30 in recording the electrical signals received from the velocity detecting means is shown in a log 48 depicted in FIG. 4B. The log 48 reveals that between the depths of 3300 feet and 3500 feet the velocity of the gas was relatively constant, but at 3500 feet the velocity made a step change in magnitude as signified by the log 44 having a step-like portion 50. Because the change of magnitude continued over a relatively extended distance and time (as compared to the shorter impulse response), this third response indicates that a large quantity of the gas is flowing out of the conduit at the depth of 3500 feet. Therefore, the response 50 qualitatively indicates that a defective valve or an orifice is located at 3500 feet and that it is permitting an excessive quantity of gas to flow therethrough.

FIG. 4B also shows a spike-like response 52 at a depth of 4500 feet. As with the response illustrated in FIG. 4A, the spike-like response 52 indicates that a closed valve is located at a depth of 4500 feet.

Thus, from the logs created by the signal processing and recorder means 30 in response to the electrical signals from the velocity detecting means, a qualitative analysis of what is located or transpiring downhole can be made. In particular a small, impulse-like response indicates a change in internal diameter of the conduit which is brought about by a collar or other identifiable structural element, and a spiked response indicates a larger identifiable structural element, such as a mandrel, while a step-like portion of a log indicates an uncontrolled loss of fluid. Thus, by utilizing the velocity detecting means and the recording means a direct correlation can be made between changes in the detected velocity and identifiable downhole phenomena.

Additional logs are generated by the signal processing and recorder means 30 for the pressures and temperatures detected by the pressure detecting means 26 and the temperature detecting means 28, respectively. These logs preferably are related to the velocity log by time and distance (depth) so that volumetric flows of the gas can be calculated. These flows are based on the equation of state and standard temperature and pressure calculations. In other words, the total volumetric flow and percentages thereof, such as occur at open or leaking valves along the conduit, can be determined. In general these calculations are made using the equation of state:

$$P_1 V_1 / T_1 = P_2 V_2 / T_2$$

Where:
- $V_1$ = Volume at the downhole tool conditions as determined from the log generated from the electrical signals transmitted by the velocity detecting means;
- $V_2$ = Volume at standard temperature and pressure;
- $P_1$ = Pressure at downhole tool conditions as determined from the pressure log;
- $P_2$ = Atmospheric pressure at sea level (standard pressure);
- $T_1$ = Temperature at downhole tool conditions in degrees Rankine as determined from the temperature log; and
- $T_2$ = Temperature in degrees Rankine at 60° F. (standard temperature).

By inserting the specific values in the above equation, the volumetric computations can be made.

The embodiment disclosed in FIG. 2 operates similarly to that disclosed in FIG. 3. However, differences arise in making the calculations with the equation of state. In particular, in the FIG. 2 embodiment both the pressure and temperature are recorded at the top of conduit 8 and thus do not measure the parameters of the gas flowing through the conduit 8 at locations corresponding to those at which the velocity detecting means detects the velocity of the gas. However, the temperature and pressure at these corresponding locations can be calculated using the pressures and temperatures at the top of conduit 8. For example, $P_1$ is determined by adding the detected pressure at the top of the conduit 8 to the atmospheric pressure and multiplying that sum by a known pressure factor for the particular depth at which the corresponding velocity is recorded. Similarly the temperature at the top of the conduit 8 is used to determine $T_1$ by applying known temperature gradients thereto.

From the above it is apparent that the velocity log is used to qualitatively analyze the composition and operation of the downhole structure through which the fluid flows, and the three logs of the velocity, pressure and temperature are used to make standard temperature and pressure calculations and to quantitatively determine volumetric flows of the fluid through the fluid flow path.

While the preferred embodiments disclosed illustrate the use of the present invention in a gas lift well wherein gas is injected through tubing, such as conduit 8, it is equally applicable to a system where gas is injected through the well bore annulus, and oil is lifted through the tubing to the surface. In this instance, however, the detecting means could be disposed and parameters monitored in the annulus, rather than in the tubing.

Thus, the present invention for monitoring conditions in a fluid flow path is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A system for monitoring conditions in a fluid flow path along which a fluid flows, the fluid flow path being defined by a conduit having a plurality of identifiable structural elements, said system comprising:
    velocity detecting means for detecting the velocity of the fluid at a plurality of positions along the fluid flow path as the fluid flows therealong; and
    recording means for recording the velocity detected at each of said plurality of positions so that substantial variations in the recorded velocities are perceivable for correlation to the identifiable structural elements of the conduit defining the fluid flow path.

2. A system as defined in claim 1, further comprising pressure detecting means, associated with said recording means, for determining pressure in the fluid flow path.

3. A system as defined in claim 2, further comprising temperature detecting means, associated with said recording means, for sensing temperature in the fluid flow path.

4. A system as defined in claim 3, wherein said recording means includes means for providing an output correlating the velocities, pressures and temperatures detected by said velocity detecting means, pressure detecting means and temperature detecting means.

5. A system as defined in claim 3, wherein:
    said velocity detecting means generates an electrical signal proportional to the detected velocity;
    said pressure detecting means generates an electrical signal proportional to the detected pressure;
    said temperature detecting means generates an electrical signal proportional to the sensed temperature; and
    said recording means includes means for processing the electrical signals generated by said detecting means and for providing an output correlating the detected velocity, pressure and temperature.

6. A system as defined in claim 1, further comprising pressure detecting means, associated with said recording means, for determining the pressure of the fluid at a plurality of locations along the fluid flow path.

7. A system as defined in claim 6, further comprising temperature detecting means, associated with said recording means, for sensing the temperature of the fluid at a plurality of locations along the fluid flow path.

8. A system as defined in claim 7, wherein said recording means includes means for providing an output correlating the velocities, pressures and temperatures detected by said velocity detecting means, said pressure detecting means and said temperature detecting means.

9. A system as defined in claim 7, wherein:
    said velocity detecting means generates an electrical signal proportional to the detected velocity;
    said pressure detecting means generates an electrical signal proportional to the detected pressure;
    said temperature detecting means generates an electrical signal proportional to the sensed temperature; and
    said recording means includes means for processing the electrical signals generated by said detecting means and for providing an output correlating the detected velocity, pressure and temperature.

10. A system as defined in claim 1, wherein said substantial variations include:
    an impulse-like response signifying the location of a first one of the structural elements of the conduit; and
    a spike-like response signifying the location of a second one of the structural elements of the conduit.

11. A system for monitoring conditions in a well having fluid injected therein through a fluid inlet means, said system comprising:
    velocity detecting means for detecting the velocity of the fluid at a plurality of locations within the fluid inlet means as the fluid flows therethrough; and
    recording means, responsive to said velocity detecting means, for providing a response signifying the location in the well of an identifiable structural element and for providing another response signifying the passage of the fluid from the fluid inlet means.

12. A system as defined in claim 11, wherein:
    said response includes:
    an impulse-like response signifying the location of conduit coupling means disposed along the fluid inlet means; and
    a spike-like response signifying the location of valve mounting means positioned along the fluid inlet means; and
    said another response has a step-like form indicating a large quantity of fluid is flowing out of the fluid inlet means.

13. A system as defined in claim 11, further comprising pressure detecting means, associated with said recording means, for determining pressure of the injected fluid at the top of the fluid inlet means.

14. A system as defined in claim 13, further comprising temperature detecting means, associated with said recording means, for sensing temperature of the injected fluid at the top of the fluid inlet means.

15. A system as defined in claim 14, wherein said recording means includes means, responsive to said pressure detecting means and said temperature detecting means, for providing an output correlating the pressures and temperatures detected by said pressure detecting means and said temperature detecting means to the velocities detected by said velocity detecting means.

16. A system as defined in claim 15, wherein:
said response includes:
an impulse-like response signifying the location of conduit coupling means disposed along the fluid inlet means; and
a spike-like response signifying the location of valve mounting means positioned along the fluid inlet means; and
said another response has a step-like form indicating a quantity of fluid is flowing out of the fluid inlet means.

17. A system as defined in claim 15, wherein:
said velocity detecting means generates an electrical signal proportional to the detected velocity;
said pressure detecting means generates an electrical signal proportional to the detected pressure;
said temperature detecting means generates an electrical signal proportional to the sensed temperature; and
said recording means includes means for processing the electrical signals generated by said detecting means and for providing an output correlating the detected velocity, pressure and temperature.

18. A system as defined in claim 11, further comprising pressure detecting means, associated with said recording means, for determining the pressure of the fluid at a plurality of locations in the well.

19. A system as defined in claim 18, further comprising temperature detecting means, associated with said recording means, for sensing the temperature of the fluid at a plurality of locations in the well.

20. A system as defined in claim 19, wherein said recording means includes means, responsive to said pressure detecting means and said temperature detecting means, for providing an output correlating the pressures and temperatures detected by said pressure detecting means and said temperature detecting means to the velocities detected by said velocity detecting means.

21. A system as defined in claim 20, wherein:
said response includes:
an impulse-like response signifying the location of conduit coupling means disposed along the fluid inlet means; and
a spike-like response signifying the location of valve mounting means positioned along the fluid inlet means; and
said another response has a step-like form indicating a quantity of fluid is flowing out of the fluid inlet means.

22. A system as defined in claim 21, wherein:
said velocity detecting means generates an electrical signal proportional to the detected velocity;
said pressure detecting means generates an electrical signal proportional to the detected pressure;
said temperature detecting means generates an electrical signal proportional to the sensed temperature; and
said recording means includes means for processing the electrical signals generated by said detecting means and for providing an output correlating the detected velocity, pressure and temperature.

23. In a fluid recovery system of the type including a fluid-containing well, a gas source, a gas injection conduit through which the gas from the gas source is injected into the well to lift therefrom the fluid contained therein, and valve means disposed in said conduit for controllably releasing the gas from the conduit into the well, the improvement comprising:
velocity detecting means for detecting the velocity of the gas at a plurality of locations within the conduit so that the location and the status of the valve means are thereby ascertained.

24. In a fluid recovery system as defined in claim 23, the further improvements comprising:
pressure detecting means, associated with said velocity detecting means, for determining the pressure at a plurality of locations within the conduit;
temperature detecting means, associated with said velocity detecting means and said pressure detecting means, for sensing the temperature at a plurality of locations within the conduit; and
means for recording the detected velocities, pressures, and temperatures so that each recording of each parameter is correlated by time of detection and depth of detection with a respective recording of each other parameter.

25. A method of monitoring conditions in a fluid flow path along which a fluid is flowing, the fluid flow path being defined by a conduit having a plurality of identifiable structural elements, said method comprising the steps of:
detecting the velocity of the fluid at a plurality of locations as the fluid flows along the fluid flow path; and
recording the velocity detected at each of the plurality of locations so that the recorded velocities are perceivable for correlation to the identifiable structural elements of the conduit defining the fluid flow path.

26. A method as defined in claim 25, further comprising the step of determining pressure in the fluid flow path.

27. A method as defined in claim 26, further comprising the step of sensing temperature in the fluid flow path.

28. A method as defined in claim 27, wherein the step of recording includes providing an output correlating the detected pressures and temperatures with the detected velocities.

29. A method as defined in claim 25, further comprising the step of determining the pressure of the fluid at a plurality of locations along the fluid flow path.

30. A method as defined in claim 29, further comprising the step of sensing the temperature of the fluid at a plurality of locations along the fluid flow path.

31. A method as defined in claim 30, wherein the step of recording includes providing an output correlating the detected pressures and temperatures with the detected velocities.

32. A method as defined in claim 25, further comprising the steps of:
   determining pressure in the fluid flow path;
   sensing temperature in the fluid flow path; and
   applying values corresponding to the detected velocity, the determined pressure and the sensed temperature to the equation of state for making standard temperature and pressure calculations and for quantitatively determining volumetric flows of the fluid through the fluid flow path.

33. A method of discerning physical phenomena in a well, comprising the steps of:
   injecting a gas into the well;
   detecting the velocity of the gas at a plurality of locations as the gas flows downward in the well;
   recording each detected velocity;
   comparing the detected velocities; and
   identifying the physical phenomena from the comparison of the detected velocities.

34. A method as defined in claim 33, further comprising the step of determining the pressure of the injected gas near the location at which the gas is injected into the well.

35. A method as defined in claim 34, further comprising the step of sensing the temperature of the injected gas near the location at which the gas is injected into the well.

36. A method as defined in claim 35, wherein the step of recording includes providing an output correlating the detected pressures and temperatures with the detected velocities.

37. A method as defined in claim 33, further comprising the step of determining the pressure of the gas at a plurality of positions in the well.

38. A method as defined in claim 37, further comprising the step of sensing the temperature of the gas at a plurality of positions in the well.

39. A method as defined in claim 38, wherein the step of recording includes providing an output correlating the detected pressures and temperatures with the detected velocities.

40. A method as defined in claim 33, further comprising the steps of:
   determining the pressure of the gas in the well;
   sensing the temperature of the gas in the well; and
   applying values corresponding to the detected velocity, the determined pressure and the sensed pressure to the equation of state for making standard temperature and pressure calculations and for quantitatively determining volumetric flows of the gas through the well.

41. In a fluid flow system of the type including a fluid-conducting conduit, a fluid source, and an identifiable structural element disposed in the conduit, the improvement comprising:
   velocity detecting means for detecting the velocity of the fluid at a plurality of locations within the conduit so that the location of the structural element in the conduit is thereby ascertained.

* * * * *